United States Patent [19]
Shirotori

[11] Patent Number: 4,882,643
[45] Date of Patent: Nov. 21, 1989

[54] DISC DRIVE MOTOR

[75] Inventor: Yozo Shirotori, Nagano, Japan

[73] Assignee: Kabushiki Kaisha Sankyo Seiki Seisakusho, Nagano, Japan

[21] Appl. No.: 341,274

[22] Filed: Apr. 20, 1989

Related U.S. Application Data

[63] Continuation of Ser. No. 89,802, Aug. 27, 1987, abandoned.

[30] Foreign Application Priority Data

Aug. 27, 1986 [JP] Japan .................................. 61-200975

[51] Int. Cl.$^4$ ............................................. G11B 5/012
[52] U.S. Cl. ................................................. 360/99.08
[58] Field of Search ............... 360/97.01, 97.03, 98.01, 360/98.07–98.08, 99.04, 99.08, 99.11, 99.12; 310/156, 268, 67 R, 89

[56] References Cited

U.S. PATENT DOCUMENTS 4,519,010 5/1985 Elsaesser .......................... 360/98 X

FOREIGN PATENT DOCUMENTS 2173049 10/1986 United Kingdom .................. 360/98

Primary Examiner—A. J. Heinz
Attorney, Agent, or Firm—Sughrue, Mion, Zinn, Macpeak & Seas

[57] ABSTRACT

A disc drive motor having a rotor magnet at the internal circumference surface of a hub supporting a disk at its external circumferential surface. The rotor magnet is opposed to an internal motor stator. The hub is formed by inserting a yoke made of magnetic material almost in the shape of cup during aluminum die casting. At least a part of the internal circumference surface of the yoke is exposed and the motor magnet is fixed to the exposed part at the internal circumference surface of the yoke.

6 Claims, 2 Drawing Sheets

DISC DRIVE MOTOR

This is a continuation of Ser. No. 089,802, filed 8/27/87, now abandoned.

BACKGROUND OF THE INVENTION

The present invention relates to a disc drive motor for rotary drive of a disk used as an information signal recording medium.

In an inner hub type disk drive motor, the hub which loads a disk at its circumference itself forms a rotor of the motor. Therefore, the hub must, in addition to functioning as the disk loading body, also function as the yoke which together with the rotor case of the motor form a magnetic circuit. In addition, the hub must be plated or provided with other rust preventive measures in order to eliminate adhesion of dust by rust at the disc surface. Moreover, a magnetic disc is required to reduce, as much as possible, the leakage of magnetic flux from the hub toward the magnetic disc surface.

FIG. 5 indicates structure of a hub used for a conventional disc drive motor. In FIG. 5, a hub 2 is made through forging or casting from aluminum, aluminum alloy or the like. A yoke 3 made of soft magnetic material is thermocompression bonded or adhered to the hub 2.

In the conventional art explained above, the hub as a whole is formed almost cylindrically with a flange. The external circumference of the hub is to be engaged with the clamp member holding the disc and the clamp member is to be deposited and positioned on the flange. Therefore, the external circumference of the hub and the flange surface are required to be finished with high accuracy.

Furthermore, in the above-described conventional art, the hub and the yoke are formed separately, and the yoke is adhered or thermocompression bonded to the hub so that the hub and the yoke are united into one body. Therefore, the fixing strength of the yoke to the hub is low and unstable, and the yoke is liable to be rotated with respect to the hub. Furthermore, in order to fix a disc on the flange with a clamp mechanism, the flange of the hub is required to have a considerably large bending strength. However, in the conventional art, since the yoke is not extended to the flange portion of the hub, the bending strength of the flange of the hub is insufficient. Even if the yoke is fixed to also the flange portion of the hub as well, the bending strength of the flange of the hub is still insufficient.

On the other hand, if the hub is made of stainless steel or iron material, the rigidity of the hub becomes large. However, the force of inertia also becomes large, so that a long time is required for starting and stopping, resulting in a particular problem at the time for stoppage.

SUMMARY OF THE INVENTION

The present invention is intended to eliminate the problems of the conventional art described above. It is therefore an object of the present invention to provide a disc drive motor which assures good machinability of the hub which also works as the yoke, high fixing strength of the yoke, small force of inertia of the hub and low machining cost.

To attain the above object and other objects, a disk drive motor of the present invention comprises: a motor stator; a hub for supporting at least one disk at an external circumferential surface thereof, the hub being formed in a shape of a cup and having said external circumferential surface formed of aluminum; a yoke of magnetic material partially buried within the hub and being exposed at an exposed portion at an internal circumferential surface of the hub; a rotor magnet disposed at an internal circumferential surface of the hub in external opposition to the motor stator and being fixed to the exposed portion of the yoke. The hub is formed of die cast aluminum.

In the present invention, the yoke forms a highly efficient magnetic circuit because the exposed part of internal circumference allows direct fixing of the rotor magnet. The hub integrally formed with the rotor magnet is rotatably driven when electrical power is supplied to the drive coil on the side of stator. The hub is provided with a disc, which is rotatably driven with the rotational drive of the hub.

DETAILED DESCRIPTION OF THE INVENTION

Figure 1:
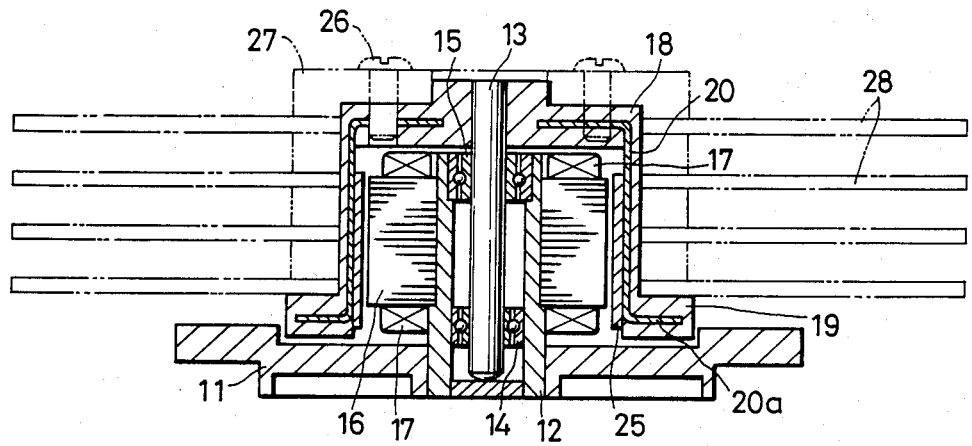
FIG. 1 is a vertical sectional view indicating an embodiment of a disc drive motor of the present invention.

The preferred embodiment of the disc drive motor of the present invention is explained hereunder.

In FIGS. 1 through 4, a cylindrical bearing holder 12 is fixed to and protrudes upwardly from a housing 11. A shaft 13 is rotatably supported by upper and lower bearings 14 and 15 at the side of the internal circumference of the bearing holder 12. A stator core 16 is engaged and fixed at the side of the external circumference of the bearing holder 12 and a drive coil 17 is wound around the stator core 16. The stator of the motor is formed by the stator core 16 and the drive coil 17.

Figure 2:
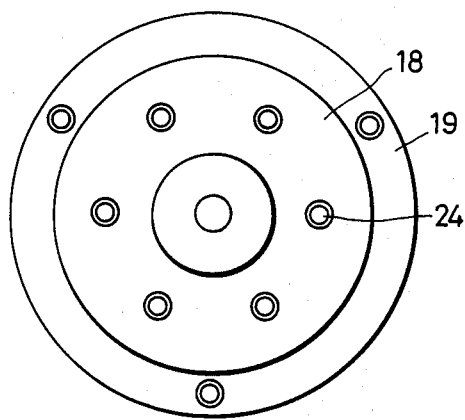
FIG. 2 is a plan view indicating a part of the hub in the embodiment of FIG. 1.
Figure 3:
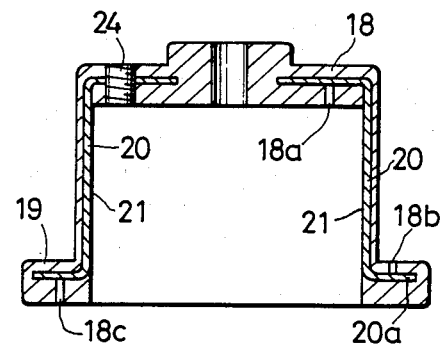
FIG. 3 is a vertical sectional view of a part of the hub of FIG. 2.

The center hole of a hub 18 is engaged with and fixed to the upper end of the shaft 13 protruding upward from the upper end of the stator. The hub 18 is formed by diecast aluminum almost in the shape of a cup having a flange 19 at the external circumference of its lower end as indicated in FIGS. 2 and 3.

The diecasting method is one of the conventionally used special casting methods. In the diecasting method, alloy having a low melting point, such as aluminum and zinc is melted, poured into a matallic mold, and pressed to be cast. According to the diecasting method, it is possible to form even an object having a thin and complicated shape, with accurate dimensions. Therefore, it is possible to make it unnecessary to achieve additional mechanical processings. Furthermore, the manufacturing speed or rate can be increased. According to the present invention, the hub 18 is produced by the aluminum diecasting method using aluminum alloy.

In the present invention, the hub 18 and a yoke 20 are formed integrally by the aluminum diecasting method using aluminum alloy such that the yoke 20 is buried in the hub 18.

The process of manufacturing the hub 18 with the yoke 20 being buried therein is as follows: The yoke 20 is fixed in the metallic mold in such a manner that the yoke 20 is supported from above and below with yoke positioning pins which are integrally formed in the metallic mold and the inside circumferential surface 21 of the yoke 20 is fixed to a surface of the mold. In this state, molten metal is poured into the inside of the mold and pressed, to thereby complete the die casting.

By the above-described method, the hub 18 having the yoke 20 is formed such that the portions of the yoke 20 are buried in the hub 18 at the bottom of the cup of the hub and at the flange portion of the hub.

The hub 18 formed as described above has a plurality of through holes 18a, 18b and 18c formed by pulling out the yoke positioning pins of the metallic mold from the hub 18 after completing the die casting of the hub 18. The hub 18 has, for example, the through holes 18a at three proper positions on a suitable circular circumference formed with its center being on a rotational axis of the hub. Similarly, there are provided three holes 18b and three holes 18c on respective circular circumferences, for example.

As described above, upon manufacturing the hub 18 by diecasting aluminum, the yoke 20 made of magnetic material almost in the shape of a cup is also inserted. A part of internal circumferential surface 21 of the yoke 20 is exposed and the cylindrical rotor magnet 25 is engaged with and fixed to the exposed part of the internal circumferential surface 21 of the yoke 20. Magnetic poles are formed in the rotor magnet 25 in its circumferential direction. The rotor magnet 25 is opposed to the external circumferential surface of the stator core 16 which forms the stator, and is apart from the stator core 16 with a predetermined distance.

The external circumferential surface of the hub 18 including the flange 19 is finished with high accuracy.

Figure 4:
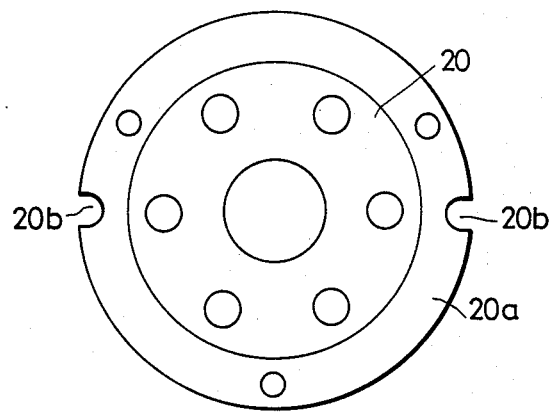
FIG. 4 is a plan view showing a part of the yoke of FIG. 1.

The yoke 20 is manufactured, for example, by the process of forging iron plate. Moreover, as shown in FIG. 4, at least one cut out 20b are also formed in the flange 20a at the lower end of the yoke 20 and relative rotation between the yoke 20 and the hub 18 can be prevented by burying the die cast aluminum of the hub 18 within the cut outs 20b. There may be formed one or a plurality of the cut outs 20b in the flange 20a. Moreover, a flange part 20a of the yoke 20 is buried within the flange 19 of the hub 18.

The external circumferential surface of the hub 18 is engaged with a disk clamp 27 which integrally holds, both from above and below, a plurality of disks 28 used as the information signal recording medium. The lower end of the integrally fixed disks 28 and the disk clamp 27 is loaded onto the flange 19 of the hub 18. Screws 26 are inserted into holes bored at several points of the disk clamp 27 and the disk clamp 27 and attached disks 28 are positioned and fixed by tightening these screws 26 into threaded holes 24 formed in the hub 18.

In the above embodiment, if the power supply to the drive coil 17 is controlled in accordance with the rotating position of the rotor magnet 25, the rotor magnet 25 and the hub 18 integrated thereto are rotatably driven by the alternating attractive and repulsive forces between the magnetic poles formed in the side of the stator and the magnetic poles of the rotor magnet 25. Thereby, the disks 28 attached to the hub 18 are also rotatably driven. The rotor magnet 25 is inserted into the die cast aluminum hub 18 and is directly fixed to the exposed surface of the yoke 20, the internal circumference of which is partly exposed. Thereby, a highly efficient magnetic circuit can be structured.

According to this embodiment, the yoke 20 is inserted into the hub 18 when the hub 18 is die cast from aluminum. Thereby, a sufficiently large fixing strength of the yoke 20 to the hub 18 and sufficient rigidity of the hub 18 can be attained. Moreover, the continuing rise of manufacturing cost can be suppressed because the manufacturing process of the hub 18 is comparatively simple. Moreover, since the hub 18 is manufactured mainly of aluminum, a force of inertia can be made small thereby improving the starting and stopping characteristic.

In many cases, the disks and disk clamp 27 are made of aluminum material. Therefore, when the hub 18 is mainly made of aluminum material, as in the case of this embodiment, and the external circumferential surface of the hub 18 is made of aluminum, the thermal expansion coefficients of the hub 18, the disks 28 and the disk clamp 27 match resulting in the effect of preventing error due to differential thermal expansion. In addition, the external circumferential surface of the hub 18, which is required to have higher finishing accuracy is formed of aluminum which can be easily finished with high, accuracy. Thereby, a highly accurate external circumferential surface of the hub 18 can be easily obtained.

A disk to be rotatably driven by the disk drive motor of the present invention is not restricted particularly to the illustrated type and the present invention can be adopted as the drive motor for every kind of disk used as the information signal recording medium.

Figure 5:
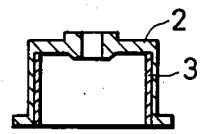
FIG. 5 is a vertical sectional view indicating an example of the conventional hub.
Figure 6A:
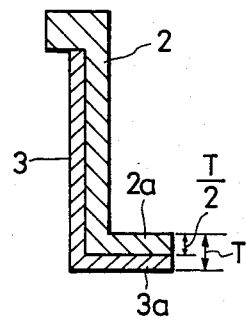
FIGS. 6A and 6B are partial vertical sectional views explaining the bending strength of the flange portion of the hub.
Figure 6B:
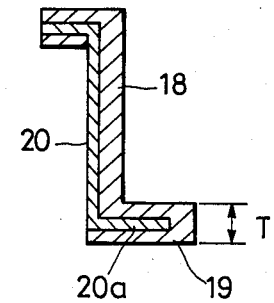

According to the present invention, since the yoke is inserted during the manufacture of the hub by aluminum die casting, the yoke is provided to the hub such that the portions of the yoke are buried in the hub at the bottom and flange portions of the hub. Therefore, the bending strength of the hub flange can be made large, as follows. In the conventional art as shown in FIG. 5, since a yoke is not extended to the flange of the hub, the flange of the hub is made of only aluminum. On the other hand, in the present invention, since the flange portion 20a of the yoke 20 is extended into the flange 19 of the hub 18, the flange 19 is made of aluminum and iron, for example. Therefore, due to the difference between the Young's Modulus of aluminum and iron, the bending strength of the flange of the hub of the present invention is larger than that of the conventional art. Furthermore, suppose that the yoke 3 of the conventional art of FIG. 5 has a flange portion 3a, and the flange of the yoke is fixed to the hub flange 2a, as shown in FIG. 6A. On the other hand, FIG. 6B shows a part of the hub and the yoke of the present invention. The bending strength of the flange of the present invention is in proportional relationship with a value $T^3$, where T represents the thickness of the flange. On the other hand, in the case of FIG. 6A, the bending strength of the hub flange is in proportional relationship with the value $(T/2)^3 \times 2$. Therefore, the strength of the hub flange of the present invention shown in FIG. 6B is four times as large as the strength of the flange of FIG. 6A.

Furthermore, according to the present invention, fixing strength of the yoke to the hub, the rigidity of the hub and particularly the rigidity of the hub flange can be made sufficiently large and the yoke can be prevented from rotating with respect to the hub. The manufacturing process of the hub of the present invention is made simple to thereby prevent a rise of manufacturing cost. In addition, since the hub is made of aluminum material, a force of inertia can be set small and the starting and stopping characteristics can be improved.

What is claimed is:

1. A disk drive motor, comprising:
   a motor stator;
   a unitary hub for supporting at least one disk at an external circumferential surface thereof, said unitary hub being formed of diecast aluminum in a shape of a cup so as to form a one-piece structure, said unitary hub having a hub flange at a side opposite a bottom of said cup of said unitary hub;
   a yoke of magnetic material having a yoke flange embedded within said hub flange such that said yoke flange is surrounded by material of said unitary hub, said yoke being exposed at an exposed portion at an internal circumferential surface of said unitary hub; and
   a rotor magnet disposed at an internal circumferential surface of said unitary hub in external opposition to said motor stator and being fixed to said exposed portion of said yoke.

2. A disk drive motor as recited in claim 1, wherein said yoke flange has formed therein at least one cutout filled by said die cast aluminum.

3. A disk drive motor as recited in claim 1, wherein said yoke comprises an iron plate.

4. A disk drive motor as recited in claim 1, further comprising a drive coil disposed adjacent said stator and housed inside said unitary hub and wherein said hub forms a motor rotor.

5. A disk drive motor as recited in claim 1, further comprising a disk clamp for clamping a plurality of said disks in an axial direction of said hub and wherein said unitary hub has a hub flange at a side opposite of a bottom of said cup of said unitary hub and said clamp clamps an axially external one of said disks against said hub flange.

6. A disk motor as recited in claim 1, further comprising a disk clamp for clamping a plurality of disks to said unitary hub and wherein said disk clamp and said disks are formed of aluminum.

* * * * *